Nov. 4, 1958

H. M. FOX 2,858,671

PRESSURE RATIO CONTROL OF GAS TURBINE BYPASS
DURING ACCELERATION OF TURBOJET ENGINE

Filed Jan. 5, 1953

INVENTOR.
H. M. Fox
BY Hudson and Young
ATTORNEYS

Nov. 4, 1958  H. M. FOX  2,858,671
PRESSURE RATIO CONTROL OF GAS TURBINE BYPASS
DURING ACCELERATION OF TURBOJET ENGINE
Filed Jan. 5, 1953  5 Sheets-Sheet 5

INVENTOR.
H. M. FOX
BY
*Hudson & Young*
ATTORNEYS

United States Patent Office 2,858,671
Patented Nov. 4, 1958

2,858,671

PRESSURE RATIO CONTROL OF GAS TURBINE BYPASS DURING ACCELERATION OF TURBOJET ENGINE

Homer M. Fox, Bartlesville, Okla., assignor to Phillips Petroleum Company, a corporation of Delaware Application January 5, 1953, Serial No. 329,536

10 Claims. (Cl. 60—39.25)

This invention relates to a method and apparatus for maintaining stable and efficient operation of a turbojet engine during acceleration. In a more specific aspect, this invention relates to a method and apparatus for bypassing a portion of the combustion chamber gases around the turbine when the ratio of combustion chamber pressure to compressor inlet pressure increases to a predetermined value.

A conventional turbojet engine usually comprises an air inlet, an air compressor, an air heating apparatus, a gas turbine, and a propulsion jet nozzle, all housed within a streamlined tubular casing. In normal operation, air enters the forward end of the tubular casing, which is pointed in the direction of flight, and is compressed in the compressor, the compressed air then being heated in the heating apparatus by the combustion of fuel supported by the compressed air. The resulting flow of fluid comprising the products of combustion and the excess compressed air drives the turbine and is then discharged through the propulsion nozzle as a jet, the reaction of which serves to propel the aircraft.

Acceleration is a particularly important regime of operation in military aircraft. Sometimes unsteady engine operation, overheating of the turbine blades and exhaust ducts, or complete engine failure has been noted during the acceleration of aircraft operating with turbojet engines. These operational difficulties have been encountered in regimes of engine operation below the equilibrium altitude operational limits of the engine and in one case, engine failure occurred at an altitude near 30,000 feet with an engine in which the controls were set to permit operation as high as 40,000 feet. A study of this operational problem indicates that the acceleration of fuel flow, in itself, has little or no effect on this type of combustion chamber performance and except for a narrow band of operation, interim conditions of pressure, temperature, and air flow do not create the difficulties encountered.

At least one the following objects will be attained by the aspects of this invention.

It is an object of this invention to provide a method and apparatus responsive to the ratio of combustion chamber pressure to compressor inlet pressure with respect to turbine speed in a turbojet engine so as to maintain stable and efficient operation during acceleration.

Another object is to provide a method and apparatus for reducing overheating of the turbine in a turbojet engine during acceleration.

Another object is to provide a device for controlling the pressure increase in the combustion chamber of a turbojet engine during acceleration.

Other objects will be apparent to one skilled in the art upon reading this disclosure in connection with the attached drawing wherein Figure 1 is a chart showing engine efficiency with respect to mass air flow versus compressor pressure ratio with constant parameter engine speeds;

Figure 1:
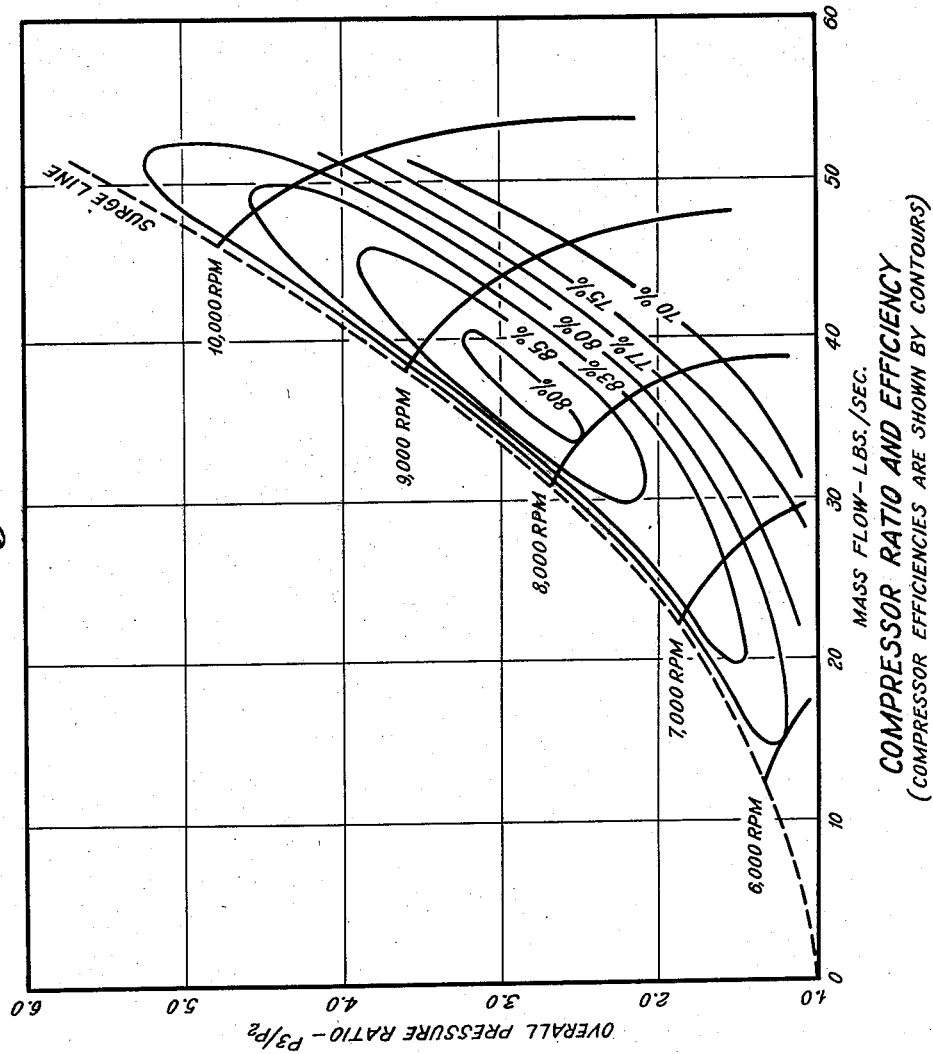

An explanation of what is believed to be the major cause of operational difficulties during acceleration is possible through an inspection of Figure 1 of the attached drawing.

Figure 1 shows a representative curve of mass air flow versus compressor pressure ratio of a typical compressor with constant parameter of engine speeds. As shown, there is a minimum flow of air at a given engine speed for stable efficient compressor operation, indicated by the line "surge line." If operation of the compressor approaches this limit at a constant engine speed, air surges to and fro through the compressor instead of passing through as a steady stream. Performance of this type is found in both centrifugal and axial flow compressors. Although controls are supposedly set to prevent operation near the "surge limit," surge often does take place and can reach such a magnitude as to damage the compressor and, in many cases, cause its complete mechanical failure. As indicated in Figure 1, it appears that compressor surge can be obtained during acceleration although equilibrium end conditions are well out of this region of operation.

In an acceleration of the engine, the throttle is moved to increase fuel flow, but engine speed does not increase at once because of the inertia of the compressor-turbine system. During this period of time the temperature and pressure in the combustion chamber increase with the combustion of the additional fuel. As indicated in Figure 1, the increase in pressure at constant speed reduces the air flow from the compressor and also the compressor efficiency with the approach of the surge limits of the compressor. Even if engine failure does not occur as result of compressor surge during this phase of acceleration, another undesirable effect, that of overheating the turbine blades, sometimes occurs because the reduced air flow and higher fuel flow enriches the fuel-air mixture and increases the flame length and combustion chamber temperature. Thus, some mechanism is also necessary to prevent turbine overheating during the acceleration of a turbojet engine.

The present invention provides a method and apparatus for reducing unstable engine operation during acceleration of the engine by controlling the pressure increase in the combustion chamber during the interval of time immediately following the increase in fuel flow and before the inertia of the compressor-turbine system has been overcome. By the method of my invention, an increase in the combustion chamber-to-compressor inlet pressure ratio ($p_3/p_2$) is detected and a quantity of the combustion gases and heated compressed air is diverted from the combustion chamber around the turbine and into the exhaust system until the turbine responds to the increase in pressure and temperature in the combustion chamber, the rotational speed of the compressor and turbine being detected by suitable means, and all of the combustion products are again directed through the turbine. By regulation of the pressure in the combustion chamber during the interval of time before compressor and turbine rotational speed increases upon acceleration of the engine, the acceleration is accomplished near maximum compressor efficiency without overheating of the turbine blades or a decrease in mass air flow through the compressor.

I have devised an acceleration control which comprises means for sensing changes in pressure and engine speed and utilizing these changes to bleed combustion products, including heated compressed air, from the combustion chamber. Some of the combustion products can simply be diverted from the turbine by a movable deflecting vane located at some point near the discharge of the combustion chamber. The combustion products diversion means can bypass the turbine by utilization of a bypass conduit containing a valve controlled by the pressure and speed sensing elements and connecting the combustion chamber with the exhaust duct so that the gases re-enter the gas stream downstream from the turbine. The bleed-off gas need not re-enter the main exhaust duct but can be expanded through a separate small exhaust nozzle. In either case, an additional thrust will be obtained facilitating aircraft acceleration. A number of deflection vanes or bypass conduits, depending upon the type of combustion chamber, are necesary to maintain efficient operation of the compressor.

Figure 2:
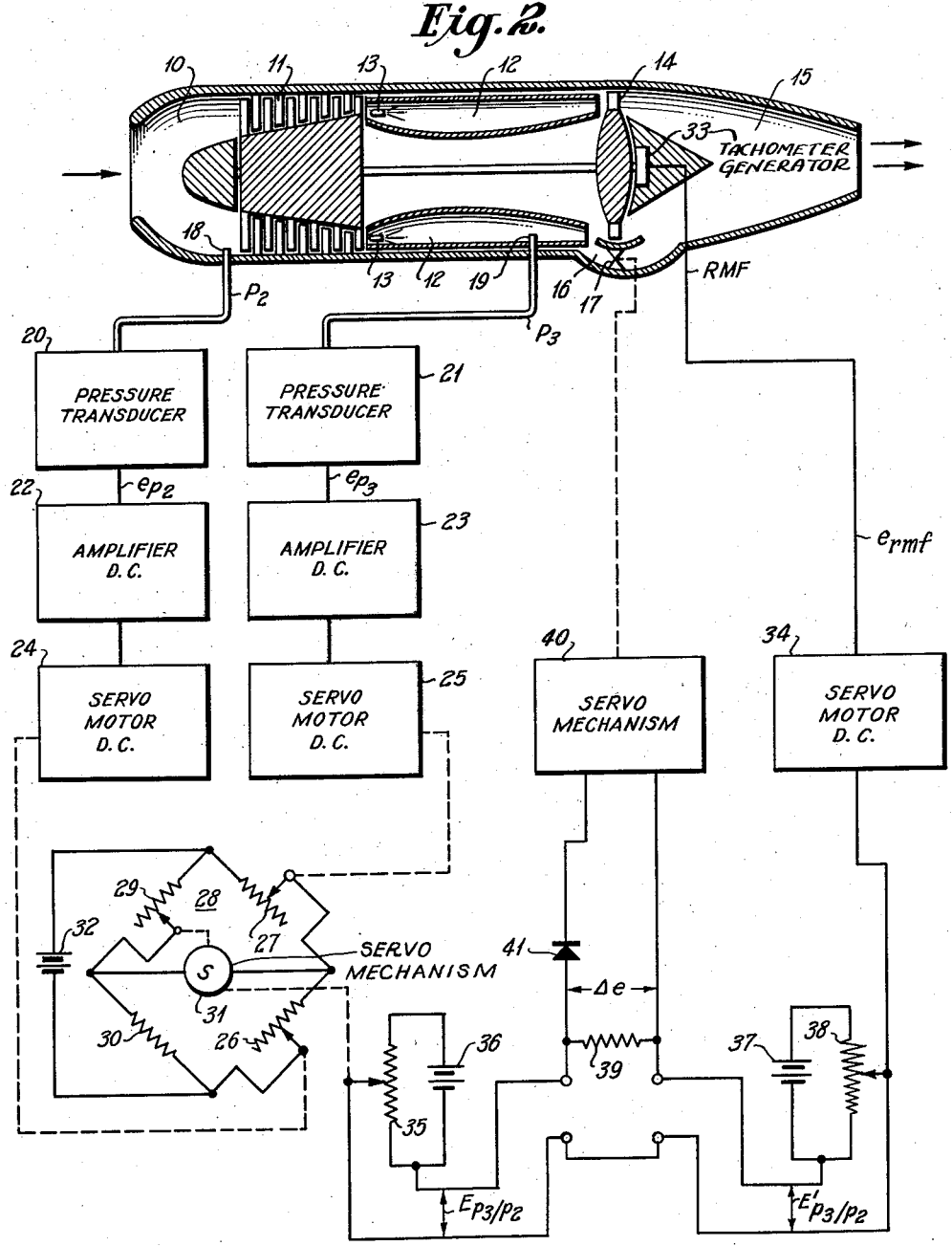
Figure 2 shows a schematic embodiment of this invention.

The embodiment in Figure 2 shows diagrammatically an electrical system for detecting an increase in the combustion chamber to compressor inlet pressure ratio $p_3/p_2$ for opening a valve in a bypass duct around the turbine and then detecting the increase in turbine speed, in response to an increase in combustion chamber pressure and temperature, for closing the valve. In this embodiment, air enters through the air inlet 10, is compressed in compressor 11 and heated in the combustion chamber 12 by combustion of fuel injected through fuel nozzles 13. The hot compressed air and combustion gases are exhausted from combustion chamber 12 through turbine 14 into the exhaust nozzle 15 resulting in the development of thrust. In accordance with my invention, some of the combustion products and heated compressed air are directed through duct 16 around turbine 14 into exhaust duct 15. A valve 17 is used to regulate the bleed-off of gases from combustion chamber 12 during acceleration in accordance with the relationship between the pressure ratio $p_3/p_2$ and the speed of the engine.

In the control system of this embodiment, the compressor inlet pressure $p_2$ is measured by the static pressure opening of a Pitot tube or other static-pressure measuring device located at the inlet of compressor 11. In a similar manner, combustion chamber pressure $p_3$ is determined by the static pressure opening of Pitot tube 19 located in chamber 12. These pressures are converted into voltages $e_{p2}$ and $e_{p3}$ by pressure transducers 20 and 21 to be amplified in amplifiers 22 and 23 and applied to servo mechanisms 24 and 25, respectively.

The pressure transducer, referred to herein, is a device for electrically measuring mechanical motions and transmitting such measurements in the form of an electrical signal. When an alternating current is transmitted, the device is essentially a differential transformer with a linear response. Such a device is described in "Principles and Methods of Telemetering" by Perry A. Borden, Reinhold Publishing Corporation, New York (1948) at page 160 et seq. A similar device is described in U. S. Patent No. 2,568,587 (1951) by W. D. Macgeorge. When direct current is to be transmitted, a device is used which utilizes the principle of the Weatstone bridge. A device of this nature is described in the above-mentioned "Principles and Methods of Telemetering" at page 56 et seq. and illustrated in Figure 22 on page 55. Such devices are known to the art and are available in a variety of forms.

Servo mechanism 24 controls variable resistance 26 and servo mechanism 25 controls variable resistance 27 of bridge network 28 containing variable resistance 29, fixed resistance 30, servo mechanism 31, and source of potential 32 in addition to resistances 26 and 27. When balance is achieved in bridge network 28, the rotation of servo mechanism 31 is proportional to changes in the pressure ratio $p_3/p_2$. The other control variable, engine speed, is measured by a tachometer-generator 33 or other device which generates a voltage $e_{rmf}$ proportional to engine speed. Voltage $e_{rmf}$ is supplied to servo mechanism 34, the rotation of which is proportional to engine speed.

Figure 5:
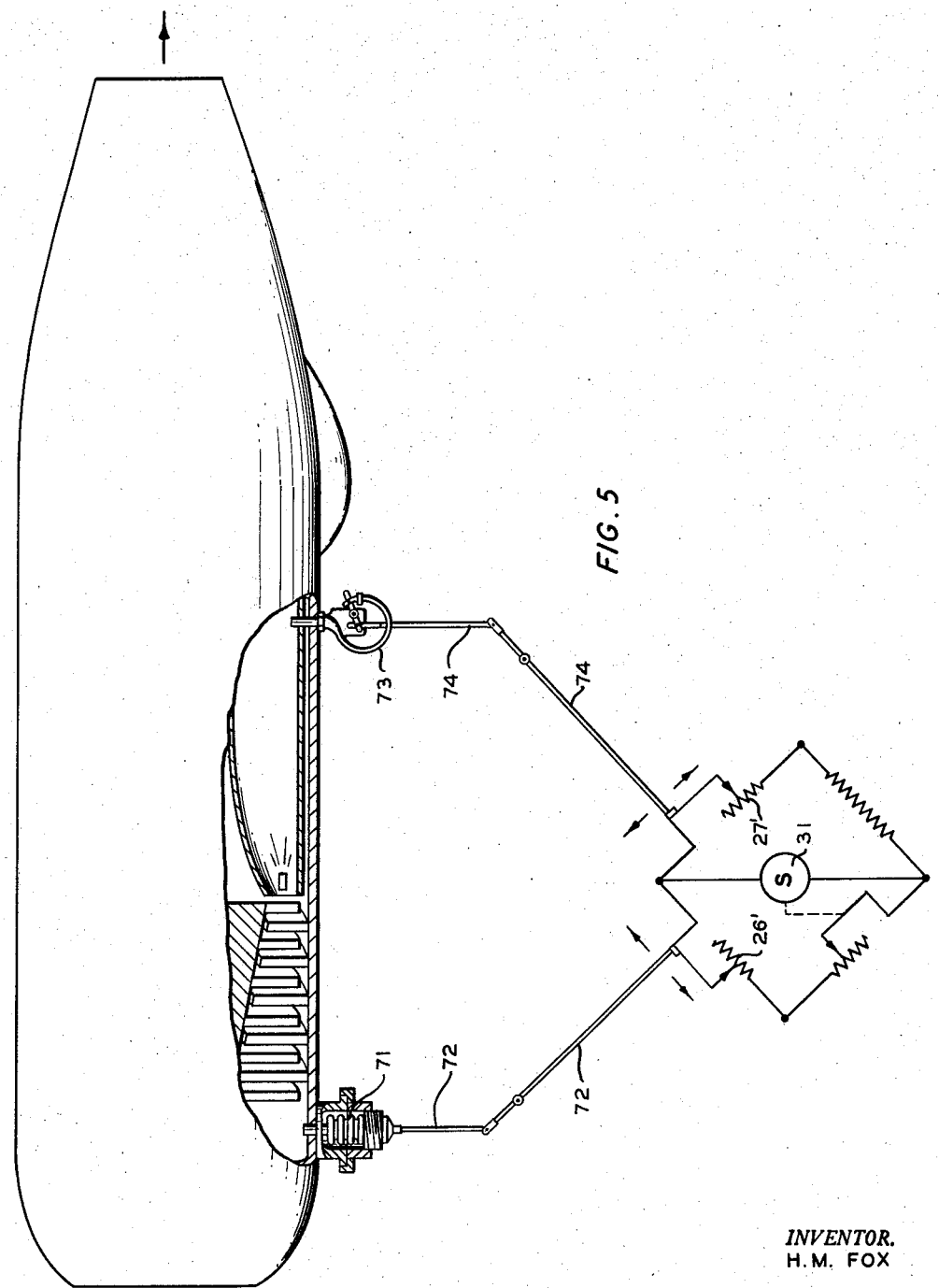
Figure 5 shows another modification of the embodiment of Figure 2.

Movable resistances 26 and 27 can also be actuated directly in response to the pressure at the compressor inlet and the pressure in the combustion chamber by a bellows, Bourdon tube, or similar pressure responsive device provided that a multiplying linkage be employed to provide sufficient movement of the contacts of resistances 26 and 27 in response to pressure changes at the compressor inlet and the combustion chamber. Utilization of such modifications is shown in Figure 5 wherein the bellows 71 transmits inlet pressure to resistance 26' through multiplying linkage 72 and Bourdon tube 73 transmits combustor pressure to resistance 27' through multiplying linkage 74.

The method for controlling valve 17 involves a comparison of voltage $E_{p3/p2}$ proportional to the pressure ratio $p_3/p_2$ with a voltage $E'_{p3/p2}$ proportional to the pressure ratio corresponding to the highest compressor efficiency at the existing engine speed. As shown in Figure 2, the voltage $E_{p3/p2}$ is obtained by connecting the mechanical output of servo mechanism 31 to the movable arm of a linear, continuously-variable potential divider 35. The voltage drop $E_{p3/p2}$, developed between the end of the winding of potential divider 35 and the contact of its movable arm by the current flowing from source of potential 36, is directly proportional to the pressure ratio $p_3/p_2$. Voltage $E'_{p3/p2}$ is developed in a similar manner in the circuit comprising source of potential 37 and potential divider 38 which, in this case, is a non-linear, continuously-variable potential divider whose resistance varies according to the relationship which is to be maintained between the pressure ratio $p_3/p_2$ and engine speed in order to maintain high compressor efficiency and to prevent surge. This relationship may be obtained for any turbine-compressor system by plotting, for any desired efficiency, the pressure ratio versus R. P. M. Since, for any point on the graph, the R. P. M., pressure ratio and efficiency are fixed, the air flow is also fixed, as may be seen from Figure 1. The magnitude of the voltages $E_{p3/p2}$ and $E'_{p3/p2}$ are compared in resistor 39 and the resulting voltage $\Delta e$ is applied to servo mechanism 40 through rectifier 41 to regulate valve 17 in bypass duct 16. During acceleration, valve 17 is open whenever voltage $E_{p3/p2}$ is greater than voltage $E'_{p3/p2}$ and is closed whenever $E_{p3/p2}$ is equal to or less than $E'_{p3/p2}$. Rectifier 41 makes the control circuits operative during acceleration.

Figure 4:
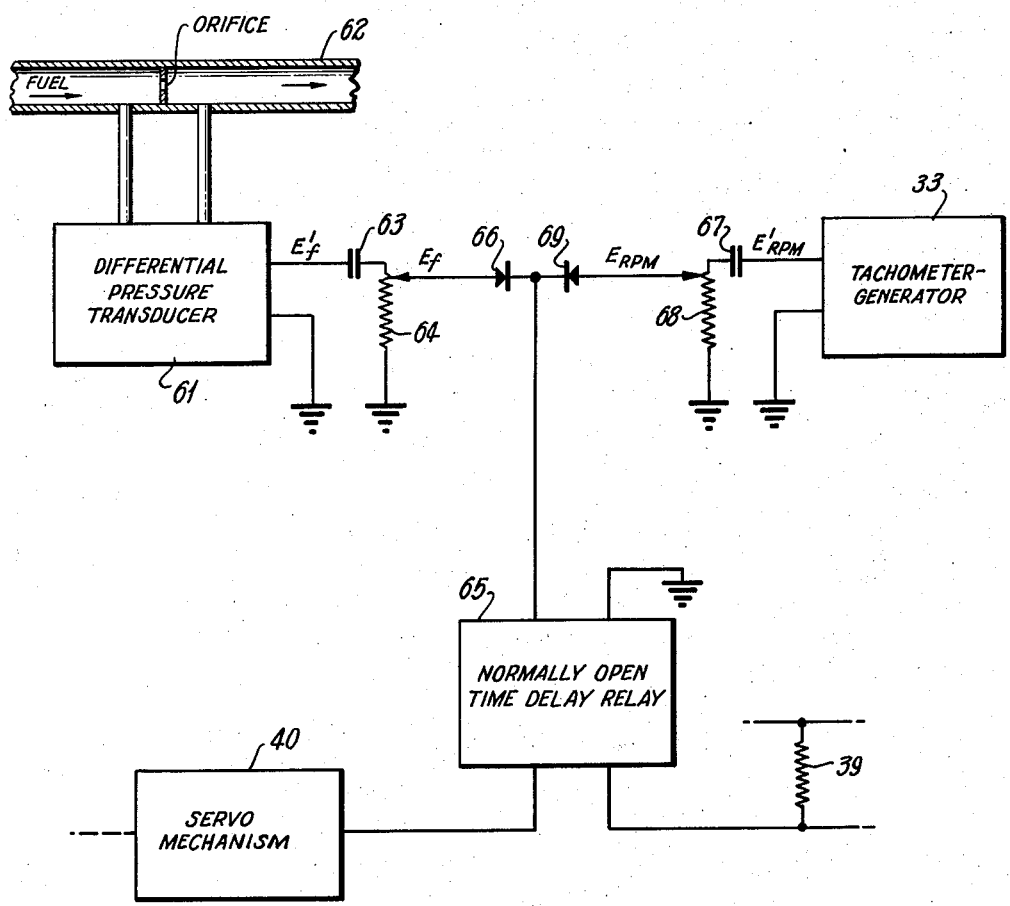
Figure 4 shows a modification of the embodiment of Figure 2.

Figure 4 shows a cut-out mechanism which can be used in the above-described modification of this invention in connection with/or substituted for the rectifier 41. The purpose for such cut-out mechanism is to render the entire control circuit inoperative except during periods of acceleration and during periods of increasing turbine speeds. Such mechanism comprises a differential pressure transducer 61 operatively connected to the fuel line 62 so as to produce an E. M. F. proportional to the fuel flow. The signal from this transducer is fed across a differentiating circuit comprising a condenser 63 and a resistor 64 in series so that a voltage drop across the resistor is generated proportional to the rate of change of fuel flow. This signal is operatively connected to a normally open time delay relay 65 in the control circuit so as to close said relay when the fuel flow is increasing. A rectifier 66 in the lead from the transducer to the relay will allow current to flow in only one direction thus making the relay operating signal operable only when fuel flow is increasing.

A tachometer generator, 33 of Figure 1, is operatively connected to the turbine as in Figure 1 so as to produce a signal proportional to the rotational speed of the turbine. This signal is also fed to the normally open time delay relay through a differentiating circuit comprising a condenser 67, a resistor 68, and a rectifier 69 similarly to the signal from the pressure transducer to the normally open time delay relay. This device will leave the control circuit open except during periods of increased fuel flow and during periods of increasing turbine speed. In order to insure that the time period of increasing fuel flow, during acceleration, will overlap the period of time when the turbine speed becomes responsive to the acceleration.

A timing device is utilized to keep the relay closed for a specified time once it has been closed by a signal from the fuel flow pressure transducer. Time delay relays are well known and are available in a variety of forms. In this modification, the tachometer control circuit of the preceding paragraph is incorporated in the cut-out mechanism in such manner that the normally open relay is closed, and remains closed for the specified time upon an increase in either the fuel flow or R. P. M., thus making the main control circuit operative upon increase of either variable. Such a cut-out mechanism has the advantage of making the main control circuit operative upon an increase in R. P. M., without an increase in fuel flow, such as might be caused, for example, by an increase in altitude.

Figure 3:
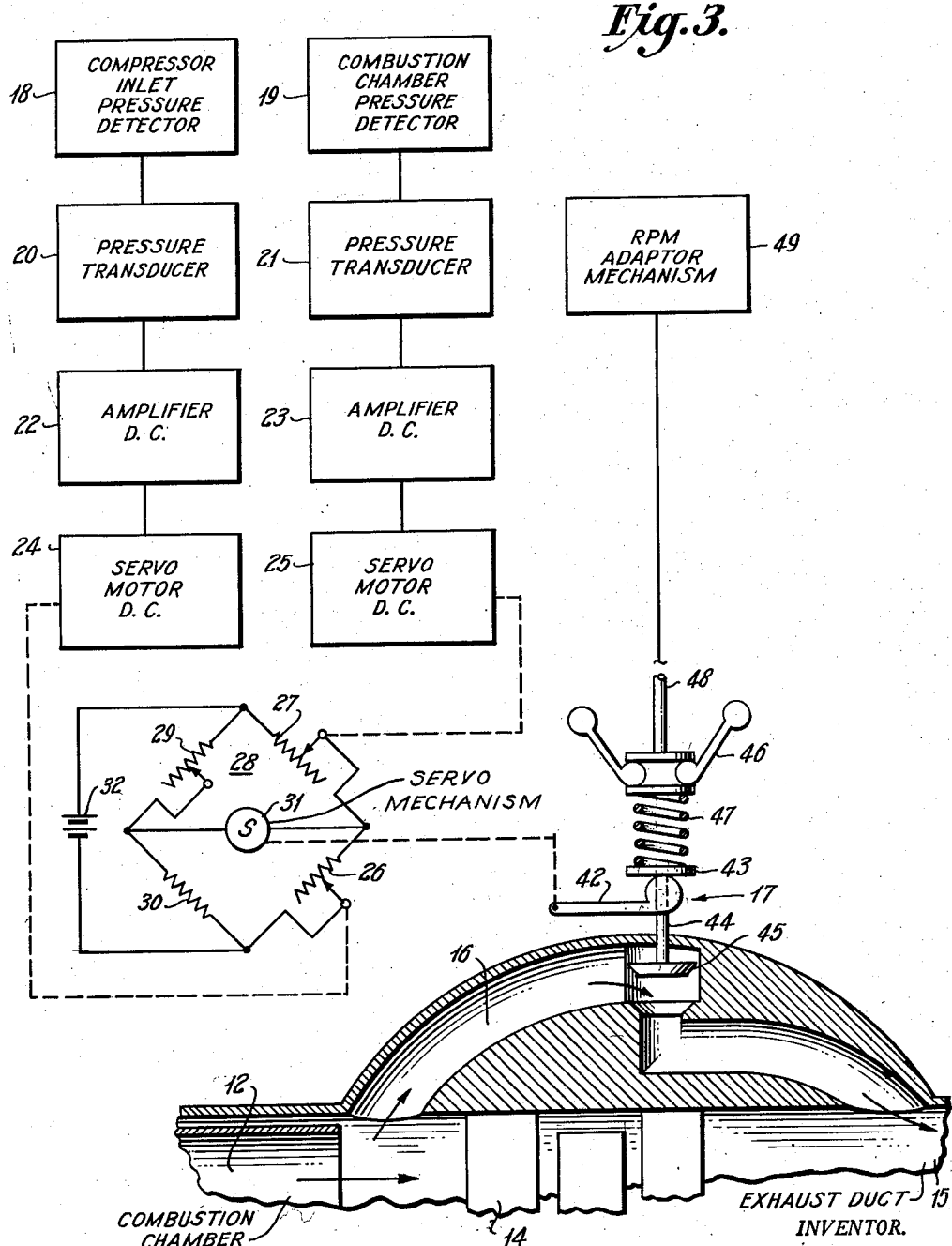
Figure 3 is a schematic showing of another embodiment of my invention.

In the control circuits of the embodiment in Figure 3, the pressure ratio $p_3/p_2$ is developed in a manner similar to the embodiment shown in Figure 2. In Figure 3, where the same reference characters are used for corresponding parts of Figure 2, the mechanical output of servo mechanism 31 of bridge network 28 is used to open control valve 17 in bypass duct 16 and a spring-loaded mechanical governor is used to close valve 17 when the engine speed has increased in response to the increase in temperature and pressure in the combustion chamber. The mechanical output of servo mechanism 31, proportional to pressure ratio $p_3/p_2$, is applied through a suitable linkage 42 to the control disc 43 rigidly attached by extended member 44 to the valve gate 45 of valve 17 to open valve 17 against a force developed by the fly-ball governor 46 and transmitted through compression type spring 47. Governor 46 operates through mechanical linkages 48 and adaptor mechanism 49 from the compressor-turbine shaft (not shown). Fly-ball governor 46 may be any type mechanical governor which develops an axial force in accordance with the rotational speed of the rotating elements of the governor.

In this embodiment, with acceleration of the engine and an increase in the pressure ratio $p_3/p_2$, mechanical linkage 42 acts against the force developed by governor 46 and spring 47 to open valve 17 and thereby control the pressure in the combustion chamber. The gases bypassed around the turbine are never more than the decrease in air flow, through the compressor, normally resulting during acceleration as a result of the pressure ratio increase. As soon as the turbine responds to the increase in pressure and temperature in the combustion chamber and its speed increases, the force developed on control disc 43 by governor 46 and spring 47 increases and closes valve 17. When mechanical linkage 42 is actuated to open valve 17, the action of governor 46 and spring 47 determines the pressure ratio at which the bypass valve is opened. The characteristics of spring 47 are such as to permit the opening of valve 17 at optimum pressure ratios for each speed so that smooth and efficient compressor operation is obtained between any two engine speeds at any altitude or flight speed.

Variations and modifications are possible within the scope of the disclosure of this invention the essence of which is that a method and apparatus have been devised to provide stable turbojet engine operation during periods of accelerations by bypassing a portion of the combustion chamber gases around the turbine.

I claim:

1. A method for improving acceleration characteristics of a turbojet engine which comprises bypassing a portion of the gases from the combustion chamber around the turbine when the ratio of combustion chamber pressure to compressor inlet pressure is increased to a value indicating incipient surge conditions at prevailing turbine rotational speed; and terminating said by-pass step when the conditions of turbine rotational speed and pressure ratio are in a stable operating range.

2. An apparatus for improving acceleration characteristics in a turbojet engine including a compressor, combustor and turbine, which comprises means for bypassing a portion of the combustion gases around said turbine; pressure responsive means adapted to sense the ratio of combustor pressure to compressor inlet pressure operatively connected to said bypassing means so as to open said bypass when said ratio is increased to a value indicating incipient surge conditions at prevailing turbine rotational speed and means for closing said bypass when the rotational speed of the turbine is increased so that a stable separating range is reestablished.

3. In a turbojet engine comprising a compressor, a combustion chamber, and a turbine the improvement which comprises pressure responsive means for sensing and comparing the compressor inlet pressure to the combustion chamber pressure; a bypass valve adapted to bypass a portion of the combustion chamber discharge gases around the turbine, said valve being operatively connected to said pressure responsive means so as to open said valve when the ratio of combustion chamber pressure to compressor inlet pressure is increased to a predetermined value indicating onset of incipient surge conditions; and means operatively connected to the turbine and the bypass valve so as to close the valve when the turbine rotational speed is increased so that a stable operating range is reestablished.

4. A turbojet engine comprising an air inlet; a compressor; a combustion chamber; a turbine; an exhaust outlet; means operatively connected to said air inlet so as to sense inlet air pressure and convert same into a first electrical signal; means for amplifying said first signal; a first servomotor operatively connected to one arm of a Wheatstone bridge circuit so as to vary the resistance of said arm in response to changes in said first signal; means operatively connected to said combustion chamber so as to sense combustion chamber pressure and convert same into a second electrical signal; means for amplifying said signal; a second servomotor operatively connected to an adjacent arm of said Wheatstone bridge so as to vary the resistance of said arm in response to changes in said second signal; a third servomotor means operatively connected to a third arm of said Wheatstone bridge so as to vary the resistance of said arm to balance the bridge circuit; a linkage operatively connecting the bridge balancing servo means to the movable arm of a linear potentiometer having a source of potential connected to the terminal ends thereof; a tachometer-generator device operatively connected to said turbine so as to produce an electrical signal proportional to the rotational speed of the turbine; a fourth servomotor actuated by the signal from the tachometer and operatively connected to the movable arm of a non-linear potentiometer having a source of potential connected to the terminal ends thereof; leads connecting the movable arms of said potentiometers; a lead connecting output of the linear potentiometer and a lead connecting the output of the non-linear potentiometer connected across a resistance and through a rectifier means to a fifth servomotor; and a by-pass valve operatively connected to said last named servomotor so as to open and bypass combustion chamber gases around said turbine when the ratio of combustion chamber pressure to compressor inlet pressure is increased to a predetermined value indicating onset of incipient surge conditions and to close when the turbine speed is increased to a predetermined value indicating reestablishment of a stable operating range.

5. A turbojet engine comprising an air inlet; a compressor; a combustion chamber; a turbine; an exhaust outlet; means operatively connected to said air inlet so as to sense inlet air pressure and convert same into a first electrical signal; means for amplifying said first signal; a first servomotor operatively connected to one arm of a Wheatstone bridge circuit so as to vary the resistance of said arm in response to changes in said first signal; means operatively connected to said combustion chamber so as to sense combustion chamber pressure and convert same into a second electrical signal; means for amplifying said signal; a second servomotor operatively connected to an adjacent arm of said Wheatstone bridge so as to vary the resistance of said arm in response to changes in said second signal; a third servomotor means operatively connected to a third arm of said Wheatstone bridge so as to vary the resistance of said arm to balance the bridge circuit; a linkage operatively connecting the bridge balancing servo means to a means for operating a bypass valve situated between the combustion chamber and the exhaust section so as to bypass combustion chamber gases around the turbine when the ratio of combustion chamber pressure to compressor inlet pressure is increased to a predetermined value indicating onset of incipient surge conditions; a spring-loaded mechanical governor operatively connected to said bypass valve and operatively connected to said turbine so that increasing turbine speed actuates said governor to close said valve when a predetermined relationship is attained between the compressor to inlet pressure ratio and turbine speed indicating reestablishment of stable conditions.

6. A turbojet engine comprising an air inlet; a compressor; a combustion chamber; a turbine; an exhaust outlet; a bypass valve adapted and arranged to bypass combustion chamber gases around said turbine; pressure responsive means operatively connected to said air inlet, said combustion chamber, and said valve so as to open said valve when the ratio of combustion chamber pressure to inlet pressure is increased a predetermined amount indicating onset of incipient surge conditions; and rotational velocity responsive means operatively connected to said turbine and to said valve so as to close said valve when the rotational speed of the turbine is increased so that a stable operating range is reestablished.

7. The engine of claim 6 wherein the rotational velocity responsive means is a tachometer-generator and the valve is closed through a servo device responsive to the electrical signal produced by the tachometer-generator.

8. The engine of claim 6 wherein the rotational velocity responsive means is a spring-loaded governor, the constants of the spring being such that an increase in turbine speed acts to close said valve.

9. In a turbojet engine comprising a compressor, a combustion chamber, a fuel line connecting a supply of fuel to said combustion chamber, and a turbine, the improvement which comprises pressure responsive means for sensing and comparing the compressor inlet pressure to the combustion chamber pressure; a bypass valve adapted to bypass a portion of the combustion chamber discharge gases around the turbine, said valve being operatively connected to said pressure responsive means so as to open said valve when the ratio of combustion chamber pressure to compressor inlet pressure is increased to a predetermined value indicating onset of incipient surge conditions; means operatively connected to the turbine and the bypass valve so as to close the valve when the turbine rotational speed is increased to a value at which a stable operating range is reestablished; and means operatively connected to all of the hereinbefore referred to means and to said fuel line so as to render all of said hereinbefore referred to means inoperative except when flow of fuel through said fuel line is increasing.

10. A turbojet engine comprising an air inlet; a compressor; a combustion chamber; fuel line connecting a supply of fuel and said combustion chamber; a turbine; an exhaust outlet; means operatively connected to said air inlet so as to sense inlet air pressure and convert same into a first electrical signal; means for amplifying said first signal; a first servomotor operatively connected to one arm of a Wheatstone bridge circuit so as to vary the resistance of said arm in response to changes in said first signal; means operatively connected to said combustion chamber so as to determine combustion chamber pressure and convert same into a second electrical signal; means for amplifying said signal; a second servomotor operatively connected to an adjacent arm of said Wheatstone bridge so as to vary the resistance of said arm in response to changes in said second signal; a third servomotor means operatively connected to a third arm of said Wheatstone bridge so as to vary the resistance of said arm to balance the bridge circuit; a linkage operatively connecting the bridge balancing servomotor means to the movable arm of a linear potentiometer having a source of potential connected to the terminal ends thereof; a tachometer-generator device operatively connected to said turbine so as to produce an electrical signal proportional to the rotational speed of the turbine; a fourth servomotor actuated by the signal from the tachometer and operatively connected to the movable arm of a non-linear potentiometer having a source of potential connected to the terminal ends thereof; leads connecting the movable arms of said potentiometers; a lead connecting output of the linear potentiometer and a lead connecting the output of the non-linear potentiometer connected across a resistance to a normally open time delay relay means; means operatively connected to said fuel line so as to sense fuel flow and to convert same into a signal proportional to fuel flow; a first differentiating circuit connecting said fuel flow sensing means to said relay means so as to close said relay when fuel flow is increasing; means operatively connected to said turbine so as to sense the rotational speed of said turbine and to convert same into a signal proportional to said speed; a second differentiating circuit connecting said speed sensing means to said relay means so as to close said relay when turbine rotational speed is increasing; a lead connecting said relay to a fifth servomotor; and a bypass valve operatively connected to said last named servomotor so as to open and bypass combustion chamber gases around said turbine when the ratio of combustion chamber pressure to compressor inlet pressure is increased to a predetermined value indicating onset of incipient surge conditions and to close when the turbine speed is increased to a value at which a stable operating range is reestablished.

References Cited in the file of this patent

UNITED STATES PATENTS

| | | |
|---|---|---|
| 2,219,994 | Jung | Oct. 29, 1940 |
| 2,280,835 | Lysholm | Apr. 28, 1942 |
| 2,527,732 | Imbert | Oct. 31, 1950 |
| 2,559,623 | Holmes | July 10, 1951 |
| 2,627,717 | Waller | Feb. 10, 1953 |

UNITED STATES PATENT OFFICE
CERTIFICATE OF CORRECTION

Patent No. 2,858,671                                                   November 4, 1958

Homer M. Fox

It is hereby certified that error appears in the printed specification of the above numbered patent requiring correction and that the said Letters Patent should read as corrected below.

Column 1, line 53, after "one" insert -- of --; column 6, line 14, for "separating range" read -- operating range --.

Signed and sealed this 30th day of June 1959.

(SEAL)
Attest:

KARL H. AXLINE
Attesting Officer

ROBERT C. WATSON
Commissioner of Patents